(12) United States Patent
Keating et al.

(10) Patent No.: US 7,171,017 B2
(45) Date of Patent: Jan. 30, 2007

(54) APPARATUS FOR EMBEDDING DATA INTO TRANSFORM AND SPATIAL DOMAINS OF AN IMAGE

(75) Inventors: Stephen Mark Keating, Reading (GB); Jason Pelly, Reading (GB); Ian McLean, Woking (GB)

(73) Assignee: Sony United Kingdom Limited, Weybridge (GB)

( * ) Notice: Subject to any disclaimer, the term of this patent is extended or adjusted under 35 U.S.C. 154(b) by 689 days.

(21) Appl. No.: 10/006,329

(22) Filed: Dec. 6, 2001

(65) Prior Publication Data

US 2002/0122565 A1  Sep. 5, 2002

(30) Foreign Application Priority Data

Dec. 7, 2000  (GB) ................................. 0029858.8

(51) Int. Cl.
*G06K 9/00* (2006.01)
(52) U.S. Cl. ........................ 382/100; 713/176; 348/433
(58) Field of Classification Search ................ 382/100; 713/716, 176; 348/473, 433
See application file for complete search history.

(56) References Cited

U.S. PATENT DOCUMENTS 5,822,425 A  10/1998  Ezaki et al.

(Continued)

FOREIGN PATENT DOCUMENTS

EP   0860997   8/1998
EP   1001604   5/2000

OTHER PUBLICATIONS

WPI Abstract Accession No. 2000-208809 & FR 2782223 CANON Feb. 11, 2000.

C. Valens, "*A Really Friendly Guide to Wavelets*", 1999 (c.valens@mindless.com).

(Continued)

*Primary Examiner*—Bhavesh M Mehta
*Assistant Examiner*—Patrick Edwards
(74) *Attorney, Agent, or Firm*—Oblon, Spivak, McClelland, Maier & Neustadt, P.C.

(57) ABSTRACT

An image processing apparatus is operable to embed data into an image. Images such as those generated from an inter-laced scan may comprise a frame of image data, the frame comprising first and second image fields. The image processing apparatus comprises a combining processor operable to introduce the data to be embedded into at least one of the first and second fields of the image frame. As such a likelihood of a perceivable effect of the embedded data on the image may be reduced, because the images are viewed as a frame. The embedded data may also have an increased likelihood of being detected because some processing may effect the image frame more then the fields of the image. The combining processor may be operable to represent the data to be embedded in a transform domain form, and, in combination with a transform processor, combine the data to be embedded with the first and/or second fields with the image in a transform domain form or a spatial domain form. The transform domain may provide a plurality of sub-bands and the data to be embedded may be introduced into at least one of the sub-bands of the transform domain form of the first and/or second fields of the image. Furthermore, the combining processor may be operable to introduce data to be embedded into at least one other sub-band, and the combining processor may be operable in combination with the transform processor to combine the data in the other sub-band with the frame of image data in the transform or the spatial domain.

34 Claims, 7 Drawing Sheets

U.S. PATENT DOCUMENTS

| | | |
|---|---|---|
| 5,991,426 A | 11/1999 | Cox et al. |
| 6,175,639 B1 * | 1/2001 | Satoh et al. ................. 382/100 |
| 6,226,387 B1 * | 5/2001 | Tewfik et al. ............... 382/100 |
| 6,259,801 B1 * | 7/2001 | Wakasu ....................... 382/100 |
| 6,332,030 B1 * | 12/2001 | Manjunath et al. ......... 382/100 |
| 6,535,616 B1 * | 3/2003 | Hayashi et al. ............. 382/100 |

OTHER PUBLICATIONS

SMPTE Journal, *Proposed SMPTE Standard for Television—Unique Material Identifier (UMID)*, vol. 109, No. 3, Mar. 2000, pp. 221-225.

* cited by examiner

FIG. 3  Schematic of Wavelet Transform

APPARATUS FOR EMBEDDING DATA INTO TRANSFORM AND SPATIAL DOMAINS OF AN IMAGE

FIELD OF INVENTION

The present invention relates to image processing apparatus operable to embed data into images.

BACKGROUND OF INVENTION

Steganography is a technical field relating to the embedding of data into material such as video material, audio material and data material in such a way that the data is imperceptible in the material.

Watermarks are data embedded in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow, for example, a customer to view an image via, for example, the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

In U.S. Pat. No. 5,930,369 (Cox et al) it has been proposed to embed data into material information, such as images, to form a watermark, by converting the material into a transform domain and adding the data to the image in the transform domain. For the example of video images, the Discrete Wavelet Transform of these images into the transform domain, provides a form of the image in which the data can be embedded. The data to be embedded can be combined with the wavelet coefficients of one of a plurality of sub-bands which are formed in the transform domain. Generally, the data to be embedded is arranged to modulate a predetermined data sequence such as a Pseudo Random Bit Sequence (PRBS). For example, each bit of the data to be embedded is arranged to modulate a copy of the PRBS, and this copy is then added into one of the sub-bands of the image in the transform domain. The image is then converted back to the spatial domain.

Generally it is desirable in any steganographic scheme to reduce the effect of the embedded data on the material information in which the data is embedded, whilst as far as possible increasing the likelihood of correctly detecting the embedded data. For the example of video images, this represents reducing as far as possible a perceptible degradation of the image, whilst increasing the likelihood of correctly detecting the data.

SUMMARY OF INVENTION

According to the present invention there is provided an image processing apparatus operable to embed data into an image, the image comprising a frame of image data, the frame comprising first and second image fields, the apparatus comprising a combining processor operable to introduce the data to be embedded into data symbols of at least one of the first and second fields of the image frame.

It is known, for example, that video images can be generated by performing an inter-laced horizontal scan of an image. As a result, two image fields are produced for each image frame.

Some forms of processing which are applied to images can affect the image frames more than the image fields. As such, by embedding data into the fields of an image, an improvement in the robustness of the embedded data is provided. The data may be embedded in the first or the second or both of the fields of the image, with the effect that a likelihood of correctly recovering the data from the image may be increased. Furthermore, images are viewed as frames of data, so that combining the data with the fields of the image can reduce a perceivable effect of the embedded data on the image.

Although the data to be embedded may be combined with the fields of the image in the spatial domain, in preferred embodiments the combining processor may be operable to represent the data to be embedded in a transform domain form, and, in combination with a transform processor, to combine the data to be embedded with the first and/or second fields of the image in one of a transform domain form, the transform processor generating a transform domain form of the first and/or second fields, the data being combined with the first and second fields by the combining processor in the transform domain, or a spatial domain form of the first and/or second fields, the transform processor generating a spatial domain representation of the transform domain form of the data to be embedded, the data being combined with the first and/or second fields of the image by the combining processor in the spatial domain.

Introducing the data into the first and/or second fields of the image in the transform domain provides an advantage of reducing any perceivable effect of the embedded data on the image. This is because combining the data with the transform domain symbols, effectively spreads the effect of the combined data over a greater number of symbols (pixels) in the spatial domain. The data can be combined with the image in either the spatial domain or the transform domain.

Advantageously, the transform domain may provide a plurality of sub-bands and the data to be embedded may be introduced into at least one of the sub-bands of the transform domain form of the first and/or second fields of the image. Furthermore, the combining processor may be operable in combination with the transform processor to combine the data to be embedded into one other sub-band of a transform domain form of the frame of the image data. The data may be combined with the other sub-band of the image frame in either the transform or the spatial domain.

As already explained, processing which may be performed on the image may affect the frames of the image more than the fields of an image. However, it is also possible that the fields of the image may be affected by noise and processing more than the frame of the image. Therefore by introducing the data to be embedded into a sub-band of the first and/or second image fields and introducing data into a different sub-band of the image frame, some diversity is provided to the embedded data to the effect that a likelihood of correctly recovering the data may be increased.

In preferred embodiments the sub-band in which the data is introduced into one of the first and/or second fields, and the other sub-band in which the data is introduced into the image frame may include mutually exclusive spatial frequency components. Again, processing, noise and other disturbances to the image may affect one set of spatial frequency components more than another set of spatial frequency components. Therefore, by embedding the data into different sub-bands in the fields and frames of the image, a greater communication diversity is provided with the effect that the data may be more likely to be recovered correctly. Therefore, for example, the sub-band in which the data is introduced into the first and second fields may represent in the transform domain low spatial frequencies of the image in one direction and high spatial frequencies of the image in another direction, and the other sub-band in which the data is introduced in the image frame may represent in the transform domain high spatial frequencies of the image in the one direction and low spatial frequencies of the image in the another direction.

Although it will be appreciated that any appropriate transform can be used to embed the data into the image in the transform domain, in preferred embodiments, the transform is the discrete wavelet transform or the like. For the example of the discrete wavelet transform, the data symbols may be introduced into the first and/or second fields in one of the low vertical, high horizontal frequencies sub-band or the high vertical, low horizontal frequencies sub-band, and the other sub-band into which the data is introduced into the frame is the other of the low vertical, high horizontal frequencies and high vertical, low horizontal frequencies sub-bands.

Various further aspects and features of the present invention are defined in the appended claims.

DESCRIPTION OF PREFERRED EMBODIMENT

An example embodiment of the present invention will be described with reference to a watermarking system in which data is embedded into a video image. Any type of data can be embedded into the image. However, advantageously the data embedded into the image may be meta data which describes the image or identifies some attributes of the content of the image itself. An example of meta data is the Universal Material Identifier (UMID). A proposed structure for the UMID is disclosed in SMPTE Journal March 2000. A more detailed explanation of the structure of the UMID will be described later.

Watermarking System

Figure 1:
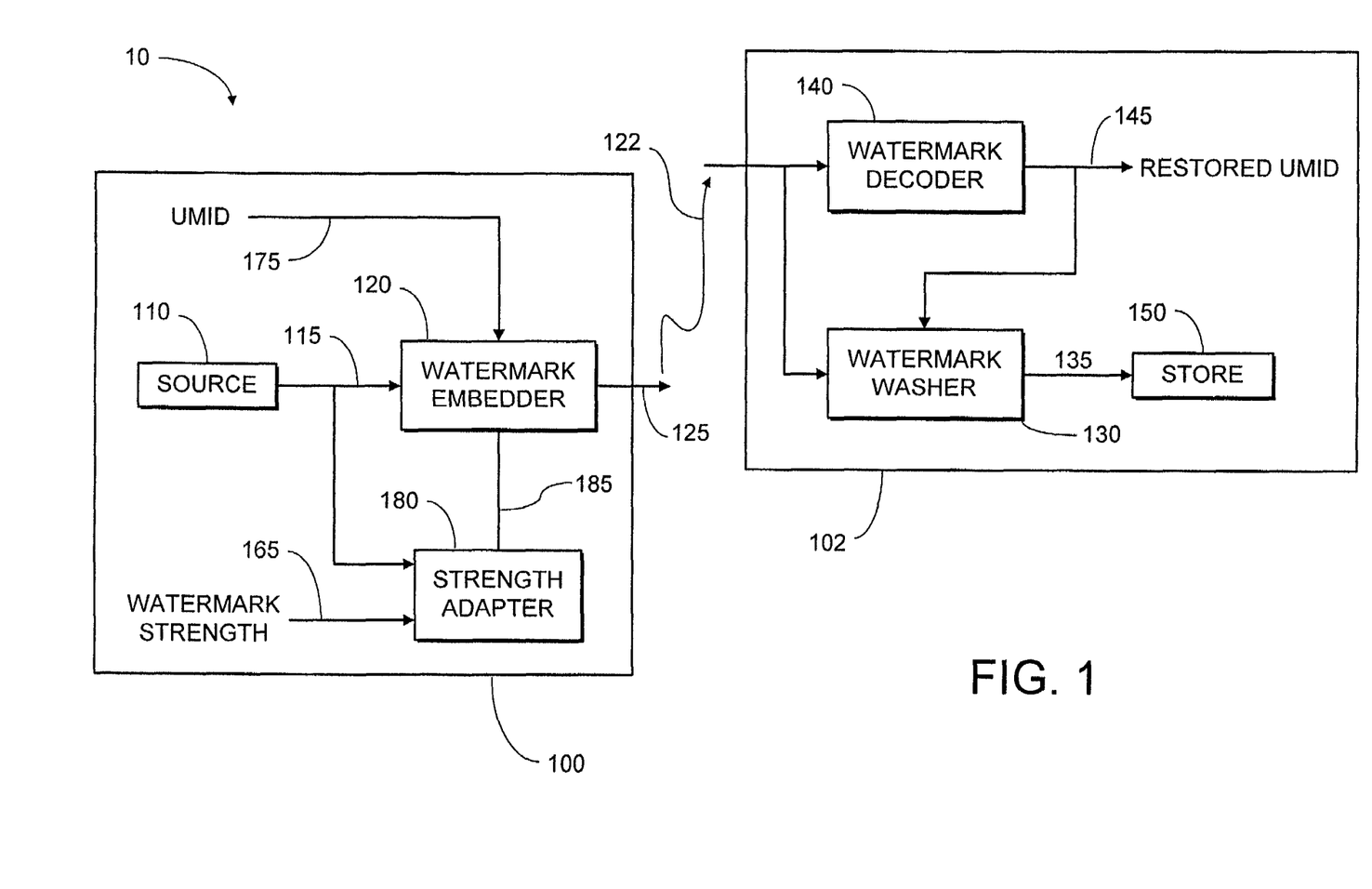
FIG. 1 is a schematic block diagram of a watermarking system.

FIG. 1 illustrates a watermarking system, generally 10, for embedding a watermark into a video image 115, and recovering and removing a watermark from the video image 115. The watermarking system 10 in FIG. 1 comprises an image processor 100 for embedding the watermark into the video image, and a decoding image processor 102 for detecting and recovering the watermark, and for removing or 'washing' the watermark from the video image.

The image processor 100 for embedding the watermark into the video image comprises a strength adapter 180, and a watermark embedder 120. The watermark embedder 120 is arranged to embed the watermark into the video image 115, produced from the source 110, to form a watermarked image 125. The watermark to be embedded into the video image is formed from data 175 representing a UMID. Generally, the UMID identifies the content of the video image, although it will be appreciated that other types of meta data which identify the content or other attributes of the image can be used to form the watermark. In preferred embodiments the watermark embedder 120 embeds the UMID into the video image 115 in accordance with a particular application strength 185 from the strength adapter 180. The strength adapter 180 determines the magnitude of the watermark in relation to the video image 115, the application strength being determined such that the watermark may be recovered whilst minimising any effects which may be perceivable to a viewer of the watermarked image 125. After embedding the watermark, the image may be transmitted, stored or further processed in some way, such as for example, compression encoding the image. This subsequent processing and transmitting is represented generally in FIG. 1 as line 122.

In FIG. 1 the decoding image processor 102 for detecting and removing the watermark is shown as comprising a watermark decoder 140, a data store 150 and a watermark washer 130 which removes the watermark from the watermarked image 125.

The watermark decoder 140 detects the watermark from the watermarked video image and in the present example embodiment, generates a restored UMID 145 from the watermarked image 125. The watermark washer 130 generates a restored image 135, by removing as far as possible the watermark from the watermarked image 125. In some embodiments, the watermark washer 130 is operable to remove the watermark from the image substantially without leaving a trace. The restored image 125 may then be stored in a store 150, transmitted or routed for further processing.

The Watermark Embedder

The watermark embedder will now be described in more detail with reference to FIG. 2, where parts also appearing in FIG. 1 have the same numerical references.

Figure 2:
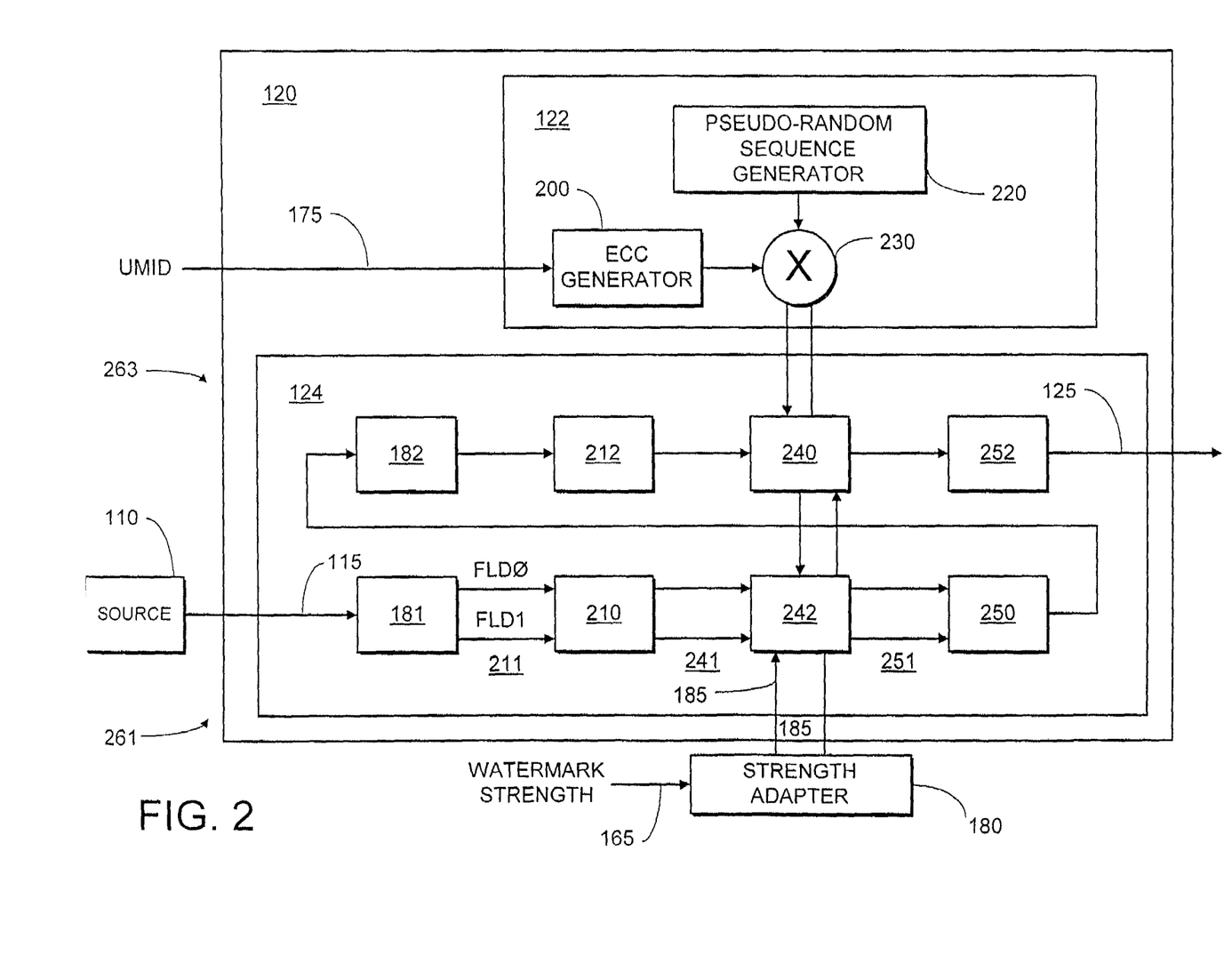
FIG. 2 is a schematic block diagram of a watermark embedder appearing in FIG. 1.

In FIG. 2 the watermark embedder 120 comprises generally a modulation processor 122 and a combining processor 124. Modulation processor 122 comprises a Pseudo Random Sequence Generator 220 which generates a pseudo random bit sequence which is fed to a first input of modulator 230. The UMID to be embedded into the image is received within the modulation processor 122 at an error correction encoder 200.

The error correction encoder operates to encode the UMID in accordance with an error correction encoding scheme. It will be appreciated that various error correction coding schemes could be used to encode the UMID. For the example embodiment the error correction encoder 200 utilises a Bose-Chaudhuri-Hocquenghem (BCH) systematic code providing 511 bit code words comprising 248 source bits of the UMID and 263 bits of redundant parity bits. Error correction encoding provides a facility for correcting errors which may be introduced into the encoded UMID, thereby improving the likelihood of correctly recovering the embedded UMID. However it will be appreciated that in other embodiments, the data may be combined with the image without being encoded using an error correction code.

The encoded UMID is fed to a second input of the modulator 230. In preferred embodiments the modulator 230 is operable to modulate each copy of a PRBS, generated by the pseudo-random sequence generator 220, with each bit of the error correction encoded UMID. The data is modulated by representing the values of each bit of the PRBS in bipolar form ('1' as +1, and '0' as −1) and then reversing the polarity of each bit of the PRBS, if the corresponding bit of the encoded UMID is a '0' and not reversing the polarity if the corresponding bit is a '1'. The modulated PRBS is then fed to the combining processor 124. The combining processor 124 will be described in more detail shortly.

Combining the encoded UMID with a PRBS has an effect of generating a spread spectrum signal representing the watermark data. In other embodiments the UMID or error correction encoded UMID may be combined with the image without being spread spectrum encoded by modulating the PRBS with each bit of the data. However, in preferred embodiments the UMID or encoded UMID is spread spectrum encoded because this allows a reduction to be made in the strength of the data to be embedded in the image. By correlating the data in the transform domain image to which the modulated PRBS has been added, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

In preferred embodiments, the combining processor 124 combines the PRBS modulated data with the image in different sub-bands of a wavelet transform of the image for both the fields of the image and the frame of the image. The encoded UMID is embedded in first and second fields of the image, and a copy of the encoded UMID is embedded in the frame of the image. However in alternative embodiments the encoded UMID may be divided into first and second parts, the first and second parts being embedded into the fields and frame of the image respectively. Generally, therefore in the following description the data embedded into the fields of the image will be referred to as a first data set, and the data embedded into the frame is referred to as a second data set.

The combining processor can be considered to be made up from a field embedding branch 261 comprising the processors in the bottom half of the combining processor 124 and a frame embedding branch comprising processors in the top half of the combing processor 124. The modulated PRBS data received from the combining processor 122 is combined with the image in the example embodiment of the present invention in the transform domain. Although any transform could be used, in the example embodiment the transform is the wavelet transform. In order to explain the embodiment of the present invention a brief description of wavelet transforms will be provided in the following paragraphs with reference to FIGS. 3 and 4.

The Wavelet Transform

Wavelets are well known and are described in for example "A Really Friendly Guide to Wavelets" by C Valens, 1999 (c.valens@mindless.com). Valens shows that the discrete wavelet transform can be implemented as an iterated filter bank, as used in sub-band coding, with scaling of the image by a factor of 2 at each iteration.

Figure 3:
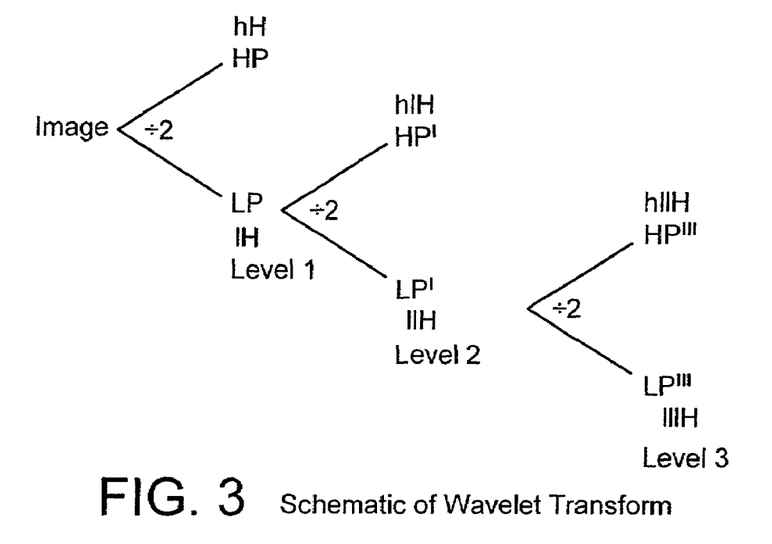
FIG. 3 is a schematic representation illustrating the form of the wavelet domain transform.

Thus, referring to FIG. 3 a spatial domain image is applied to a set of high pass HP and low pass LP filters. At level 1, the first stage of filtering, the image is filtered horizontally and vertically and, in each direction, scaled down by a factor of 2. In level 2, the low pass image from level 1 is filtered and scaled in the same way as in level 1. The filtering and scaling may be repeated in subsequent levels 3 onwards.

Figure 4:
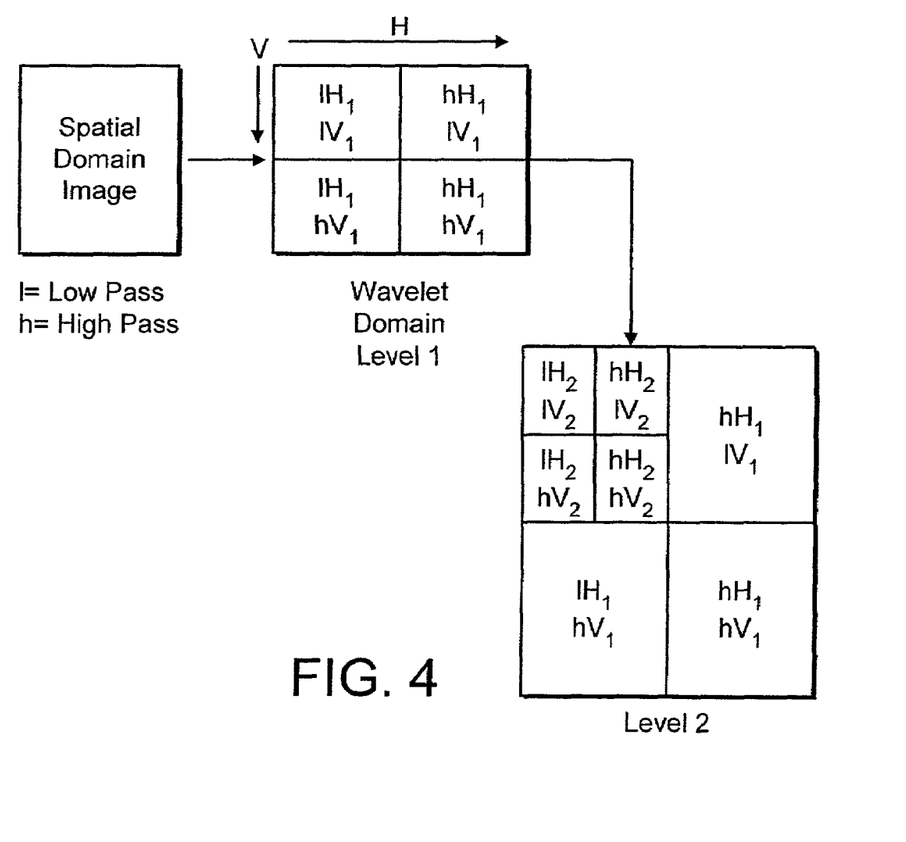
FIG. 4 is a schematic representation of an iterative filtering process which can be used to form the wavelet transform.

The result is shown schematically in FIG. 4. FIG. 4 is a representation normal in the art. The horizontal axis H indicates increasing frequency. At level one the image is spatially filtered into four bands; the lower horizontal and vertical band, $1H_1$, $1V_1$; the upper horizontal band $hH_1$, $1V_1$; the upper vertical band $1H_1$, $hV_1$; and the upper horizontal and vertical band, $hH_1$, $hV_1$. At level 2, the lower horizontal and vertical band, $1H_1$, $1V_1$ is filtered and scaled into the lower horizontal and vertical band, $1H_2$, $1V_2$; the upper horizontal band $hH_2$, $1V_2$; the upper vertical band $1H_2$, $hV_2$; and the upper horizontal and vertical band, $hH_2$, $hV_2$. At level 3 (not shown in FIG. 4), the lower horizontal and vertical band, $1H_2$, $1V_2$ is further filtered and scaled.

Combining Processor

Figure 5:
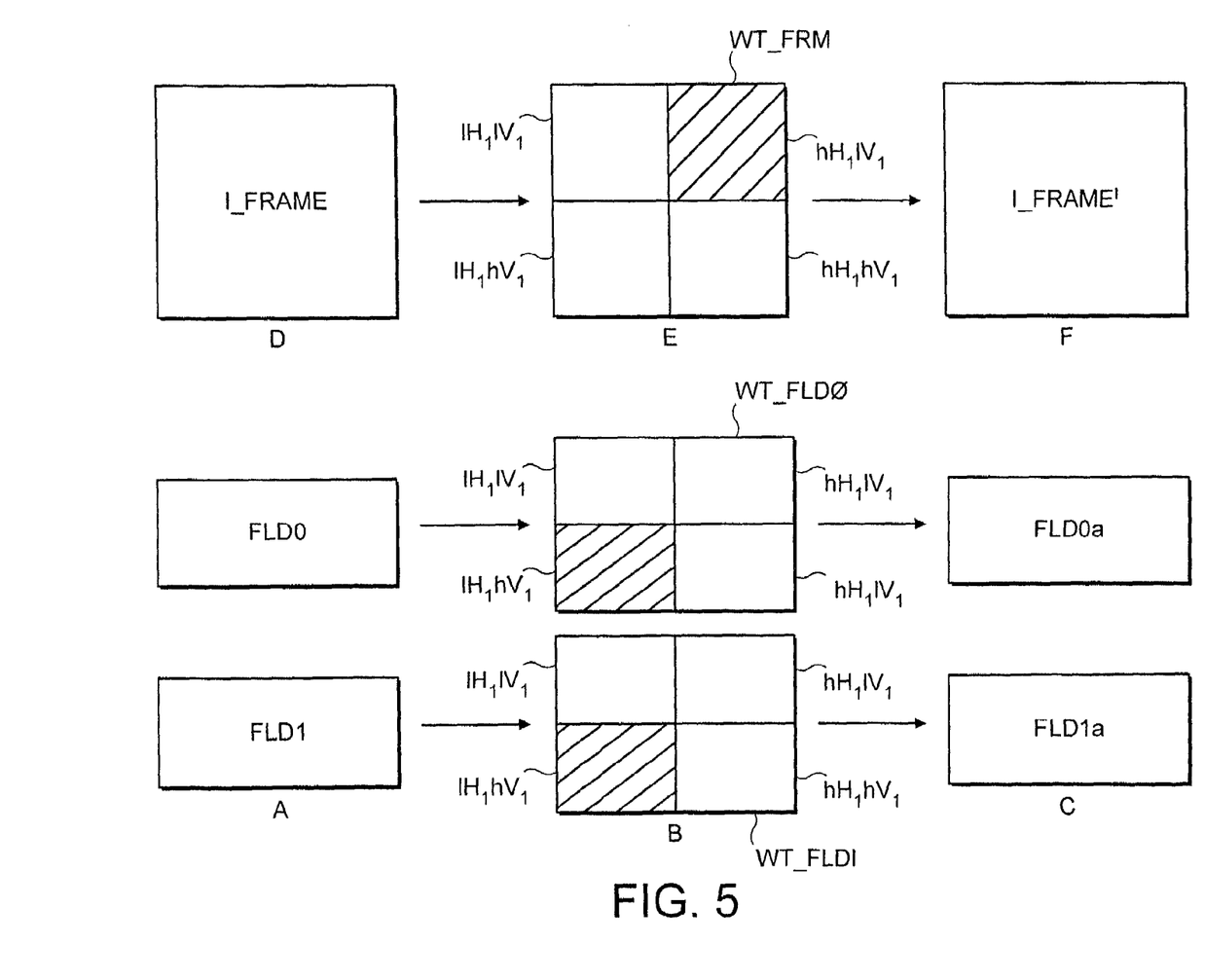
FIG. 5 is a schematic representation illustrating the operation of the watermark embedder shown in FIG. 2, at each of a plurality of stages A to F.

The operation of the combining processor 124 shown in FIG. 2 will now be explained in more detail with reference to FIG. 5. FIG. 5 provides an illustrative representation of the effect of processes performed on the image by the combining processor 124. These are represented as separate stages A to F, which represent the order and effect of processes performed by the combining processor 124.

Referring to FIG. 2, the image 115 is received from the source 110 at a field processor 181. For the example embodiment it is assumed that the image is formed from an interlaced scan of the image. Generally therefore the image will be comprised of two fields. The first and second fields FLD0, FLD1 are illustrated in FIG. 5 at stage A. The field processor 181 is arranged to separate the first and second fields FLD0, FLD1 as shown in FIG. 5 and to feed the first and second fields to a wavelet transformer 210 via parallel conductors 211 as shown in FIG. 2. The wavelet transformer 210 generates a first order wavelet transform of the first and second fields FLD0, FLD1. Correspondingly the wavelet transform for each field is shown in FIG. 5, at stage B, which provides a corresponding representation of the first order wavelet transform of the first and second fields WT_FLD0, WT_FLD1 using a corresponding notation to that used in FIG. 3.

Returning to FIG. 2, the two wavelet transformed fields WT_FLD0, WT_FLD1 are fed to a first combiner 242 via parallel conductors 241. The first combiner 242 also receives at a second input the first set of modulated PRBS data corresponding to the first copy of the encoded UMID, and at a third input the application strength α with which the PRBS data is to be combined with the image frame. The combiner 242 then combines the modulated PRBS received from the modulation processor 122 from the modulator 230 with a selected sub-band of the wavelet transform of the first and second fields WT_FLD0, WT_FLD1. For the example embodiment illustrated in FIGS. 2 and 5, the data added to the fields is introduced into the low horizontal, high vertical frequencies sub-band $1H_1hV_1$ as represented by the hatched region in the wavelet transform of the first and second fields WT_FLD0, WTFLD1. The first data set (first copy of encoded UMID) is further divided into first and second subsets of data, the first and second subsets being combined respectively with the first and second wavelet transformed fields WT_FLD0, WT_FLD1. The combiner 242 combines the modulated PRBS with the wavelet coefficients of the wavelet transformed fields WT_FLD0, WT_FLD1, by adding for each bit of the modulated PRBS a factor α scaled by ±1 in dependence upon the value of the bit of the first or second sets of data. This is represented by equation (1).

$$X'_i = X_i + \alpha_n W_i \quad (1)$$

Where $X_i$ is the i-th wavelet coefficient, $\alpha_n$ is the strength for the n-th PRBS and $W_n$ is the n-th bit of the watermark to be embedded in bipolar form, which for the example embodiment is the bit of the error correction encoded UMID.

Once the modulated PRBS's representing the first copy of the encoded UMID have been combined with the sub-band of each of the wavelet transformed fields WT_FLD0, WT_FLD1, the wavelet transform fields WT_FLD0, WT_FLD1 are fed to an inverse wavelet transformer 250 via parallel conductors 251. The inverse wavelet transform produced two fields of the image FLD0a and FLD0a having the first set of data combined with the image fields. The first and second fields embedded with the first data set are represented at stage C in FIG. 5.

Although in the example embodiment the first set of data is divided into sub-sets, each being combined with one of the first or the second fields of the image, it will be appreciated that in other arrangements the first data set could be combined with either the first or the second field in accordance with a particular data embedding requirement. Similarly, if there is sufficient embedding capacity available, the same data by be combined with each of the first and second wavelet transformed fields, thereby providing redundancy which can be used to improve the likelihood of recovering the data.

The field embedded image is then fed to a frame processor 182 forming the first processor in the upper frame combining branch 263 of the combining processor 124. Therefore, as shown in FIG. 5, at stage D, the spatial domain image having the first set of data embedded in the first and second fields is fed to the frame processor 182 which forms the fields into a frame.

Returning to FIG. 2, the frame processor 182 feeds the image frame I_FRAME to a wavelet transformer 212 which generates as before a first order wavelet transform of the image frame. The wavelet transform of the image frame is then fed to a second combiner 240. The second combiner 240 also receives at a second input the second set of modulated PRBS data corresponding to the second copy of the encoded UMID, and at a third input the application strength α with which the PRBS data is to be combined with the image frame. The second set of data (second copy of encoded UMID) is then combined with the wavelet transform frame in a different wavelet sub-band than that to which the first set of data was added to the fields of the image. In accordance with the example embodiment as shown in stage E in FIG. 5, the data is combined with the wavelet transform of the image frame WT_FRM in the high horizontal, low vertical frequencies sub-band $hH_11V_1$. The data is combined, as before, with the wavelet coefficients of the sub-band, as explained above with reference to equation (1).

Having added the second set of data into the high horizontal, low vertical frequencies sub-band $hH_11V_1$ of the wavelet transform of the image frame WT_FRM, the second combiner 240 feeds the wavelet transformed image frame WT_FRM to an inverse wavelet transformer 252 which generates a spatial domain representation of the image frame to form the watermarked image presented at an output 125. Thus in FIG. 5 the watermarked image I_FRAME' generated at the output of the inverse wavelet transformer 252 is formed at state F.

By embedding the data in only the two sub-bands $hH_11V_1$, $1H_1hV_1$, the likelihood of detecting the embedded data is improved whilst the effects that the embedded data will have on the resulting image are reduced. This is because the wavelet coefficients of the high horizontal, high vertical frequencies sub-bands $hH_1hV_1$ are more likely to disturbed, by for example compression encoding. Compression encoding processes such as JPEG (Joint Photographic Experts Group) operate to compression encode images by modifying the high frequency components of the image. Therefore, writing the data into this sub-band $hH_1hV_1$ would reduce the likelihood of being able to recover the embedded data. Conversely, data is also not written into the low vertical, low horizontal frequencies sub-band $1H_11V_1$. This is because the human eye is more sensitive to the low frequency components of the image. Therefore, writing the data in the low vertical, low horizontal frequencies sub-band would have a more disturbing effect on the image. As a compromise the data is added into the high horizontal, low vertical frequencies sub-band $hH_11V_1$ and the low horizontal, high vertical frequencies sub-bands $1H_1hV_1$. However in order to increase the likelihood of correctly detecting the embedded data and correspondingly reducing the perceived effects of the embedded data on the image, the data is written into the image into these sub-bands in the same direction as the low frequency components of the image. That is to say, the scan direction SV, SH is in the same direction as the spatial direction of the low frequencies of the wavelet sub-band. As mentioned this provides a particular advantage by increasing the likelihood of correctly detecting the embedded data because the data is being written in a direction which corresponds to the lower energy components of the image. Correspondingly, the strength of the embedded data can be reduced such that the effect on the image in the spatial domain can be reduced.

Figure 6A:
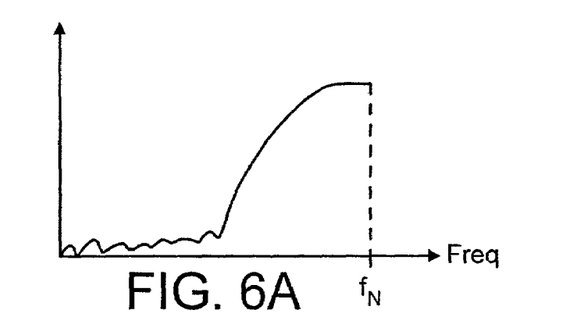
FIGS. 6a and 6b are graphical representations of an example frequency response of horizontal spatial frequencies of the image illustrating the effect of sub-sampling.
Figure 6B:
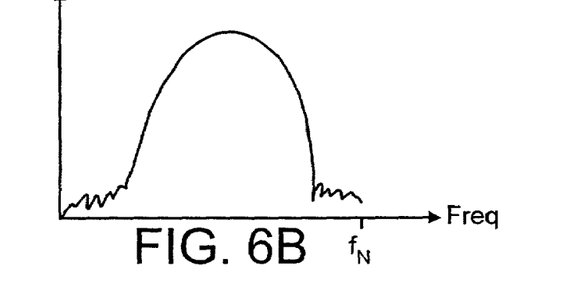
Figure 7:
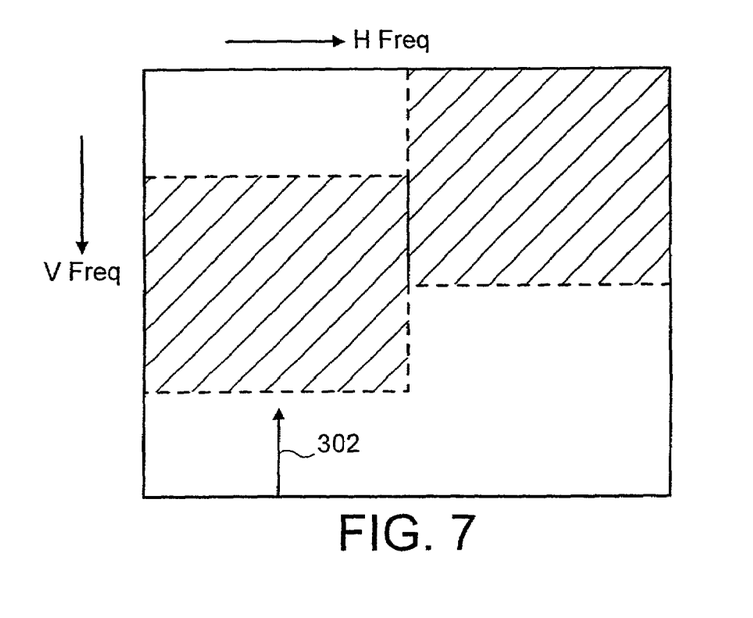
FIG. 7 is a schematic illustration of the effect of sub-sampling on the frequency components of a wavelet sub-band.

In preferred embodiments, the field processor 181 operates to sub-sample the data representing the first and second fields to the effect of shifting the sampling frequency and therefore the Nyquist frequency of the sampled data. The combining processor 240 therefore combines the modulated PRBSs of the first data set with the wavelet coefficients formed from the sub-sampled version of the first and second fields in the wavelet transform domain. Therefore, when half of the horizontal components of the image in one field are sub-sampled, the frequency response of the components of the image shown in FIG. 6a is converted as shown in FIG. 6b providing to some extent an improved resistance to aliasing errors when the data is combined with the sub-band. To this end, the field processor 181 performs the sub-sampling by picking every other line of the image frame to form the first of the two fields FLD0, FLD1, the remaining lines forming the second of the two fields. The first combiner 240 combines the first data set with the low horizontal, high vertical frequencies $1H_1hV_1$ sub-band in the first and second fields in this form. As a result, the effect on combining the data in the sub-sampled domain is represented in FIG. 7. As indicated by arrow 302 the information in the low horizontal, high vertical frequencies sub-band $1H_1hV_1$ has shifted more towards the centre of the wavelet domain representation of the image. This has an effect of providing some increased resistance to compression encoding because, as already explained, the high frequency components of the image are more likely to be corrupted.

The example embodiment of the present invention provides an improved robustness with respect to the likelihood of correctly recovering the embedded data and also reducing the likelihood of the embedded data having an effect on the image. This is because processes performed on the image and other noise can affect the field components and the frame components of the image differently. It is for this reason that, in preferred embodiments, the data to be embedded is copied, and the two copies, which form the first and second data sets, are embedded into the fields of the image and the frame of the image data, respectively. It is therefore less likely that both versions of the encoded UMID will be affected in the same way in both the frame of image data and the fields of the image. Some resistance to the disturbing effects of processing and noise is therefore provided as a result of an embedding diversity provided by combining copies of the data into the fields and the frame separately. Furthermore, as illustrated in the example embodiment, the data is embedded into different sub-bands of the wavelet transform. As such some processing, for example, may affect the low horizontal components of the image frame more than the high horizontal components. Therefore, the data embedded into the high horizontal sub-band increases the likelihood of recovering the data embedded from this sub-band correctly. Correspondingly, combining the data with the low horizontal, high vertical frequencies sub-band of the field components also provides a further resistance to the disturbing effects of processing and where the effects are more likely to be present in the high horizontal frequency components. This is particularly so where the fields have been generated in the horizontal domain. For the present example, the first and second fields both represent half the horizontal information in the image. Therefore, embedding the data into the low horizontal, high vertical frequencies sub-band again provides some reduction in the likelihood that the data would be corrupted to the extent that it cannot be correctly recovered at a decoder.

The form of the watermark embedder and the order in which the first and second data items in the image fields and image frame respectively is not limiting and is provided to facilitate understanding. It will be appreciated that there are other ways of embedding the data. In alternative arrangements, the first and second data sets comprising different content may be embedded in the image frame and fields in parallel. Furthermore, it may not be necessary to generate an inverse wavelet transform between embedding the first and second data sets.

Although in this example embodiment, the data to be embedded is combined with the image in the transform domain, in alternative embodiments the data could be represented in the transform domain, inverse transformed into the spatial domain, and added to the image in the spatial domain.

Decoder

The operation of the watermark decoder 140 will now be explained in more detail, with reference to FIG. 8, where parts also appearing in FIG. 1, bear identical reference numerals.

Figure 8:
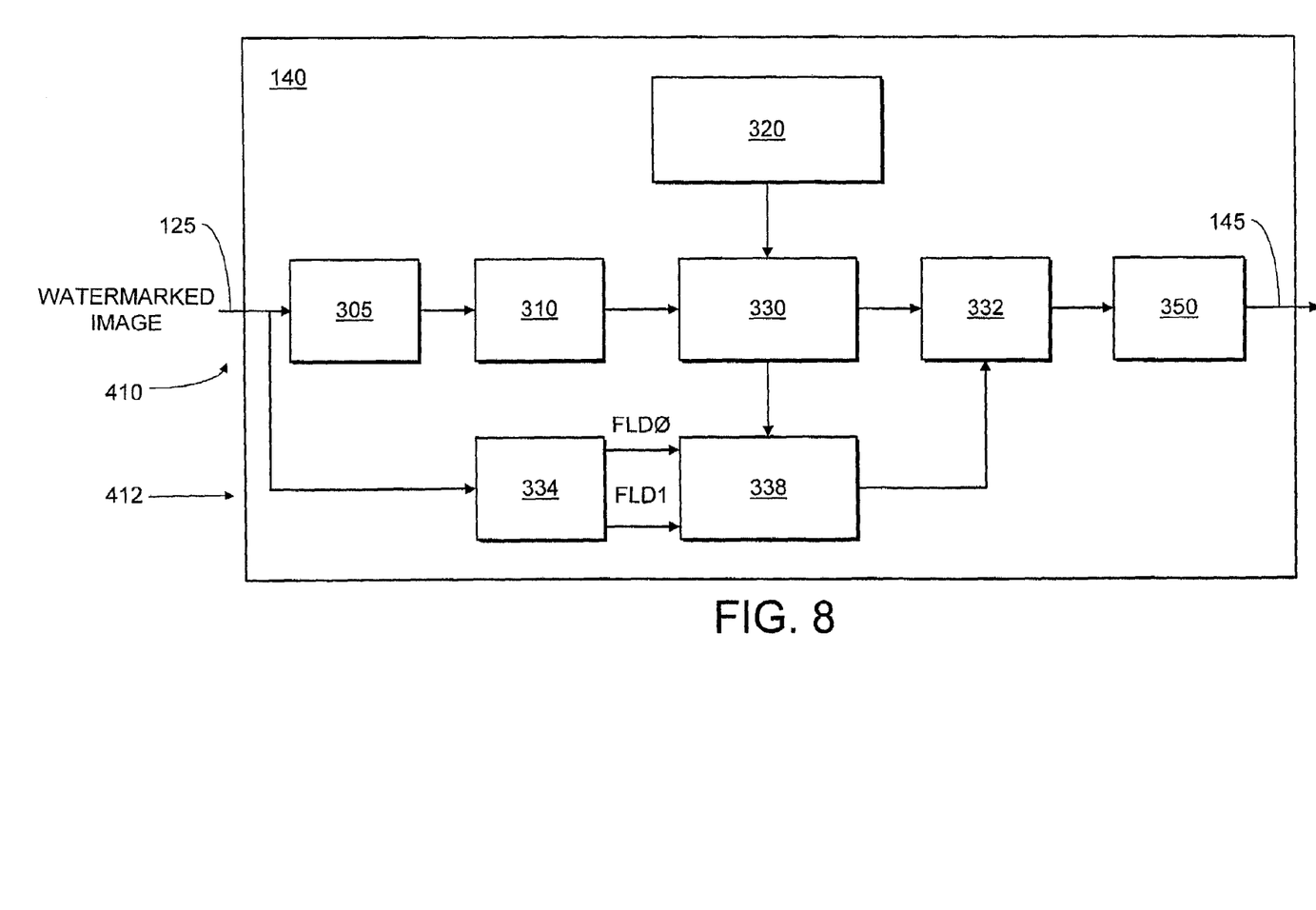
FIG. 8 is a schematic block diagram of the watermark decoder shown in FIG. 1.

The decoder 140 for detecting and recovering the data from the watermarked image is shown in more detail in FIG. 8. The watermark decoder 140 is generally divided into two branches, the upper branch 410 is arranged to detect data embedded into the image frame whereas the lower branch 412 is arranged to detect data embedded into the fields of the image.

In preferred embodiments the upper and lower branches 410, 412 operate in parallel to generate, for each embedded bit of the encoded UMID a correlation signal from the data embedded in the fields and the frame of the image respectively. The correlation signal for each bit of the encoded UMID is then combined to form a composite signal from which the bit of the encoded UMID is recovered. The operation of the decoder 140, will now be described.

The watermarked image 125 is received at a frame store 305 forming the first processing element of the upper branch 410, as shown in FIG. 8. The frame store 305 stores an image frame from which the data is to be recovered. A wavelet transformer 310 generates a wavelet transform of the image frame which is then fed to a correlator 330. The pseudo random sequence generator 320 is arranged to reproduce the PRBS which was used to embed the encoded UMID as explained with reference to the watermark embedder shown in FIGS. 1 and 2. The reproduced PRBS is fed to a second input of the correlator 330.

The correlator 330 generates a correlation output signal for each bit of the second set of data corresponding to the second copy of the encoded UMID, which has been combined with the high horizontal, low vertical frequencies sub-band $hH_1V_1$ by correlating the coefficients of this sub-band with the reproduced PRBS. This correlation is expressed as equation (2), below, where $X_n$ is the n-th wavelet coefficient and $R_i$ is the i-th bit of the PRBS generated by the Pseudo Random Sequence Generator 320.

$$C_n = \sum_{i=1}^{s} X_{sn+i} R_i \qquad (2)$$

Data is recovered from the fields of the image by separating the image into the first and second fields FLD0, FLD1. This is performed in the lower part 412 of the watermarked decoder 140 by a field processor 334 which divides the watermarked image frame into the first and second fields FLD0, FLD1. The first and second fields of the watermarked image are then fed to a second correlator 338. The second correlator 338 also receives the reproduced PRBS from the pseudo random sequence generator 320. Accordingly, it will be appreciated that each bit of the first set of data is correlated with the reproduced PRBS from the low horizontal, high vertical frequencies sub-band $1H_1hV_1$ from each of the first and second image fields to produce a correlation signal as explained with reference to data recovered from the image frame.

The correlation signals for each bit of the encoded UMID recovered respectively from the first and second correlators 330, 338 are fed to a combiner 332 and combined to form a composite signal. The data bits of the encoded UMID are then recovered from the relative sign of the composite signal, which gives an indication of the value of the bit of the embedded data in correspondence with the sign used to represent this bit in the watermark embedder.

The reproduced encoded UMID is then fed to an error correction decoder 350 which decodes the encoded UMID in accordance with the error correction code applied by the encoder 200 shown in FIG. 2. At the output of the decoder 350 a recovered version of the UMID is produced.

It will be appreciated that for both the example implementations of the watermark embedder shown in FIG. 2 and the watermarked decoder shown in FIG. 8, the embedding of the data in the fields and the frames of the image could be done in a different order or indeed could have been done in parallel. The invention is therefore not limited to any particular arrangement in which the data is embedded in the fields or the frames of the image or indeed whether the embedding is performed in the transform domain or the spatial domain. In particular, for example, if the data was added in the spatial domain, then the first and second parts of the encoded UMID to be embedded in the image could be performed in parallel for the image frame and the image fields respectively.

The Universal Material Identifier (UMID)

Figure 9A:
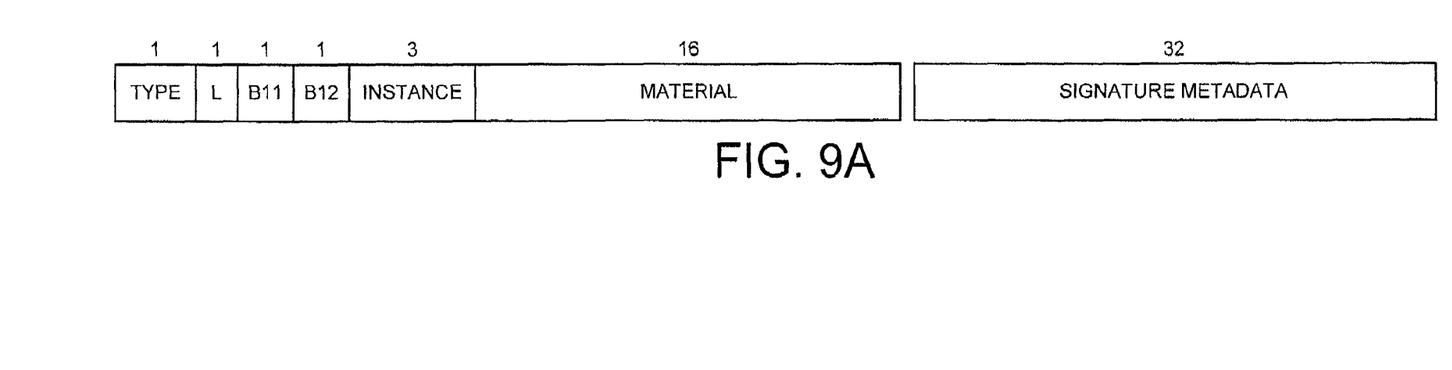
FIGS. 9A and 9B are schematic block diagrams of the structure of an extended and a basic UMID respectively.
Figure 9B:
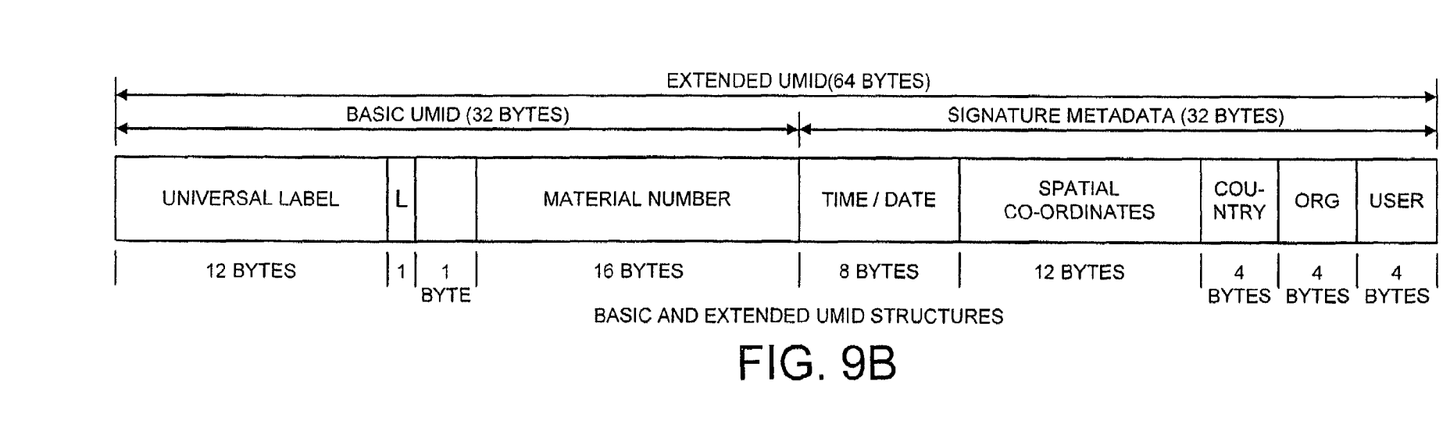

A brief explanation will now be given of the structure of the UMID, with reference to FIGS. 9A and 9B. The UMID is described in SMPTE Journal March 2000. Referring to FIG. 9A an extended UMID is shown to comprise a first set of 32 bytes of a basic UMID, shown in FIG. 9B and a second set of 32 bytes referred to as signature metadata. Thus the first set of 32 bytes of the extended UMID is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes.

More explanation of the UMID structure is provided in co-pending UK patent application number 0008432.7.

Various modifications may be made to the embodiments herein before described without departing from the scope of the present invention.

The invention claimed is:

1. An image processing apparatus operable to embed data into an image, said image comprising a frame of image data, said frame comprising first and second image fields generated from an inter-laced scan of the image, said apparatus comprising:

a combining processor operable to represent said data to be embedded in a transform domain form, and, in combination with a transform processor, to combine said data to be embedded with at least one of said first and second fields of said image in one of:

a transform domain form, said transform processor generating a transform domain form of said first and second fields, said data being combined with said first and second fields by said combining processor in said transform domain, or a spatial domain form of said at least one of said first and second fields, said transform processor generating a spatial domain representation of said transform domain form of said data to be embedded, said data being combined with said at least one of said first and second fields of said image by said combining processor in said spatial domain, wherein said transform domain provides a plurality of sub-bands and said combining processor is operable to combine data to be embedded with a first sub-band of said first field, and to combine said data with a second sub-band of said second field of said image data in said transform or said spatial domain, and wherein said first sub-band and said second sub-band comprise mutually exclusive spatial frequency components.

2. The image processing apparatus as claimed in claim 1, wherein said data embedded in said first sub-band includes first data and said data embedded in said second sub-band includes second data, said first and second data being different.

3. The image processing apparatus as claimed in claim 1, wherein said data embedded in said first sub-band and said data embedded in said second sub-band are the same data.

4. The image processing apparatus as claimed in claim 1, wherein said first sub-band in which said data is introduced into said first and second fields represents in said transform domain low spatial frequencies of said image in one direction and high spatial frequencies of said image in another direction, and said second sub-band in which said data is introduced in said image frame represents in the transform domain high spatial frequencies of said image in said one direction and low spatial frequencies of said image in said another direction.

5. The image processing apparatus as claimed in claim 1, wherein said transform processor is operable in combination with said combining processor to introduce said data to be embedded into said image in accordance with the wavelet transform, of at least one of said data, said image frame and said at least one of said first and second fields, said wavelet transform providing said plurality of sub-bands.

6. The image processing apparatus as claimed in claim 5, wherein said first sub-band into which said data is introduced into said at least one of said first and second fields has one of low vertical, high horizontal frequencies and high vertical, low horizontal frequencies sub-bands, and said second sub-band into which said data is introduced into said image frame is the other of said low vertical, high horizontal frequencies and high vertical, low horizontal frequencies sub-bands.

7. The image processing apparatus as claimed in claim 6, wherein said data is introduced into said sub-bands in a scan direction, said scan direction being in the same direction in the sub-band as the direction of the low spatial frequencies of the image.

8. The image processing apparatus as claimed in claim 1, comprising:
a modulator operable to modulate a Pseudo Random Symbol Stream with each of the data symbols to be embedded,
said modulated Pseudo Random Symbol Stream being introduced into said transform domain representation.

9. The image processing apparatus as claimed in claim 1, wherein said data is formed into first and second data sets, and said combining processor is operable to introduce said first and second data sets into said at least one of said first and second image fields of said image frame respectively.

10. The image processing apparatus as claimed in claim 9, wherein said data comprises data items, each data item and a copy of said each data item forming said first and said second data sets respectively.

11. The image processing apparatus as claimed in claim 10, wherein said data items to be embedded include a Unique Material Identifier (UMID).

12. The image processing apparatus operable to detect and recover data embedded into an image by the image processing apparatus according to claim 1, said apparatus comprising:
a data processor operable to identify at least one of first and second fields of said image into which data has been embedded;
a transform processor operable to generate a transform domain representation of said at least one of the first and second fields into which the data has been embedded; and
a data detector operable to detect and recover the data from said transform domain representation of said at least one of the first and second fields from the sub-bands into which the data has been embedded.

13. The image processing apparatus as claimed in claim 12, wherein said data detector is operable to combine first signals representative of the first data set recovered from said sub-band in said image fields, with second signals representative of the second data set from said other sub-band in said image frame to form a composite signal from which said data items are recovered.

14. A method of embedding data into an image, said image comprising a frame of image data, said frame comprising first and second image fields generated from an inter-laced scan of the image, said method comprising:
representing said data to be embedded in a transform domain form;
combining said data to be embedded with at least one of said first and second fields of said image in one of:
a transform domain form, said data being combined with said first and second fields in said transform domain, or
a spatial domain form of said at least one of said first and second fields, by generating a spatial domain representation of said transform domain form of said data to be embedded, said data being combined with said at least one of said first and second fields of said image in said spatial domain,
wherein said transform domain provides a plurality of sub-bands and said combining comprises combining data to be embedded into a first sub-band of a transform domain representation of said first field and combining said data with a second sub-band of said second field of said image data in said transform or said spatial domain,
wherein said first sub-band and said second sub-band comprise mutually exclusive frequency components.

15. The method of detecting and recovering data embedded in an image by the image processing method according to claim 14, said method further comprising:
identifying at least one of first and second fields of said image into which data has been embedded;
generating a transform domain representation of said at least one of the first and second fields into which the data has been embedded; and
detecting and recovering the data from said transform domain representation of said at least one of the first and second fields from the sub-bands into which the data has been embedded.

16. The computer program stored on a computer readable medium having computer executable instructions, which when loaded on to a data processor causes the data processor to perform the method according to claim 14.

17. The computer product stored on a computer readable medium having recorded thereon information signals representative of the computer program claimed in claim 16.

18. An apparatus for embedding data into an image, said image comprising a frame of image data, said frame comprising first and second image fields generated from an inter-laced scan of the image, said apparatus comprising:
means for representing said data to be embedded in a transform domain form;
means for combining said data to be embedded with at least one of said first and second fields of said image in one of:
a transform domain form, said data being combined with said first and second fields in said transform domain, or
a spatial domain form of said at least one of said first and second fields, by generating a spatial domain representation of said transform domain form of said data to be embedded, said data being combined with said at least one of said first and second fields of said image in said spatial domain,
wherein said transform domain provides a plurality of sub-bands and said means for combining is operable to combine data to be embedded with a first sub-band of said first field, and to combine said data with a second sub-band of said second field of said image data in said transform or said spatial domain, and
wherein said first sub-band and said second sub-band comprise mutually exclusive spatial frequency components.

19. The apparatus for detecting and recovering data embedded in an image by the apparatus according to claim 18, said apparatus further comprising:
means for identifying at least one of first and second fields of said image into which data has been embedded;
means for generating a transform domain representation of said at least one of the first and second fields into which the data has been embedded; and
means for detecting and recovering the data from said transform domain representation of said at least one of the first and second fields from the sub-bands into which the data has been embedded.

20. A computer program stored on a computer readable medium providing computer executable instructions, which when loaded on to a data processor configures said data processor to operate as an image processing apparatus as claimed in claim 1.

21. computer program product stored on a computer readable medium having recorded thereon information signals representative of the computer program claimed in claim 20.

22. An image processing apparatus operable to embed data into an image, said image comprising a frame of image data, said frame comprising first and second image fields generated from an inter-laced scan of the image, said apparatus comprising:
- a combining processor operable to represent said data to be embedded in a transform domain form, and, in combination with a transform processor, to combine data to be embedded with at least one of said first and second fields of said image in one of:
  - a transform domain form, said transform processor generating a transform domain form of said first and second fields, said data being combined with said first and second fields by said combining processor in said transform domain, or
  - a spatial domain form of said at least one of said first and second fields, said transform processor generating a spatial domain representation of said transform domain form of said data to be embedded, said data being combined with said at least one of said first and second fields of said image by said combining processor in said spatial domain,
- wherein said transform domain provides a plurality of sub-bands, said data to be embedded being introduced into at least one of said sub-bands of said at least one of said first and second fields of said image,
- wherein said transform processor is operable in combination with said combining processor to introduce said data to be embedded into said image in accordance with the wavelet transform, of at least one of said data, said image frame and said at least one of said first and second fields, said wavelet transform providing said plurality of sub-bands,
- wherein said first sub-band into which said data is introduced into said at least one of said first and second fields has one of low vertical, high horizontal frequencies and high vertical, low horizontal frequencies sub-bands, and said second sub-band into which said data is introduced into said image frame is the other of said low vertical, high horizontal frequencies and high vertical, low horizontal frequencies sub-bands,
- wherein said data is introduced into said sub-bands in a scan direction, said scan direction being in the same direction in the sub-band as the direction of the low spatial frequencies of the image.

23. The image processing apparatus as claimed in claim 22, wherein said combining processor is operable to combine data to be embedded with a first sub-band of said first field, and to combine said data with a second sub-band of said second field of said image data in said transform or said spatial domain.

24. The image processing apparatus as claimed in claim 23, wherein said first sub-band and said second sub-band comprise mutually exclusive spatial frequency components.

25. The image processing apparatus as claimed in claim 23, wherein said data embedded in said first sub-band includes first data and said data embedded in said second sub-band includes second data, said first and second data being different.

26. The image processing apparatus as claimed in claim 23, wherein said data embedded in said first sub-band and said data embedded in said second sub-band are the same data.

27. A computer program product stored on a computer readable medium providing computer executable instructions, which when loaded on to a data processor configures said data processor to operate in accordance with the method according to claim 23.

28. The image processing apparatus as claimed in claim 22, wherein said first sub-band in which said data is introduced into said first and second fields represents in said transform domain low spatial frequencies of said image in one direction and high spatial frequencies of said image in another direction, and
said second sub-band in which said data is introduced in said image frame represents in the transform domain high spatial frequencies of said image in said one direction and low spatial frequencies of said image in said another direction.

29. The image processing apparatus as claimed in claim 22, comprising:
- a modulator operable to modulate a Pseudo Random Symbol Stream with each of the data symbols to be embedded,
- said modulated Pseudo Random Symbol Stream being introduced into said transform domain representation.

30. The image processing apparatus as claimed in claim 22, wherein said data is formed into first and second data sets, and said combining processor is operable to introduce said first and second data sets into said at least one of said first and second image fields of said image frame respectively.

31. The image processing apparatus as claimed in claim 30, wherein said data comprises data items, each data item and a copy of said each data item forming said first and said second data sets respectively.

32. The image processing apparatus as claimed in claim 31, wherein said data items to be embedded include a Unique Material Identifier (UMID).

33. The image processing apparatus operable to detect and recover data embedded into an image by the image processing apparatus according to claim 22, said apparatus comprising:
- a data processor operable to identify at least one of first and second fields of said image into which data has been embedded;
- a transform processor operable to generate a transform domain representation of said at least one of the first and second fields into which the data has been embedded; and
- a data detector operable to detect and recover the data from said transform domain representation of said at least one of the first and second fields from the sub-bands into which the data has been embedded,
- wherein said data detector is operable to combine first signals representative of the first data set recovered from said sub-band in said image fields, with second signals representative of the second data set from said other sub-band in said image frame to form a composite signal from which said data items are recovered.

34. A method of embedding data into an image, said image comprising a frame of image data, said frame comprising first and second image fields generated from an inter-laced scan of the image, said method comprising:
- representing said data to be embedded in a transform domain form;
- combining said data to be embedded with at least one of said first and second fields of said image in one of:
  - a transform domain form, said data being combined with said first and second fields in said transform domain, or a spatial domain form of said at least one of said first and second fields, by generating a spatial domain representation of said transform domain form of said data to be embedded, said data being combined with said at least one of said first and second fields of said image in said spatial domain, wherein said transform domain provides a plurality of sub-bands and said data to be embedded is combined into at least one of said sub-bands, said data being combined with said at least one of said first and second fields of said image in said sub-band of said fields, said method comprises combining data to be embedded into a first sub-band of a transform domain representation of said first field; and combining said data with a second sub-band of said second field of said image data in said transform or said spatial domain, wherein said combining includes introducing said data to be embedded into said image in accordance with the wavelet transform, of at least one of said data, said image frame and said at least one of said first and second fields, said wavelet transform providing said plurality of sub-bands, wherein said first sub-band into which said data is introduced into said at least one of said first and second fields having one of low vertical, high horizontal frequencies and high vertical, low horizontal frequencies sub-bands, and said second sub-band into which said data is introduced into said image frame being the other of said low vertical, high horizontal frequencies and high vertical, low horizontal frequencies sub-bands, wherein said data being introduced into said sub-bands in a scan direction, said scan direction being in the same direction in the sub-band as the direction of the low spatial frequencies of the image.

* * * * *